United States Patent
Lambert (10) Patent No.: US 9,128,806 B2
(45) Date of Patent: Sep. 8, 2015

(54) SQUARING BINARY FINITE FIELD ELEMENTS

(75) Inventor: Robert John Lambert, Cambridge (CA)

(73) Assignee: Certicom Corp., Mississauga, ON (CA)

( * ) Notice: Subject to any disclaimer, the term of this patent is extended or adjusted under 35 U.S.C. 154(b) by 514 days.

(21) Appl. No.: 13/487,366

(22) Filed: Jun. 4, 2012

(65) Prior Publication Data

US 2012/0311007 A1 Dec. 6, 2012

(51) Int. Cl.
*G06F 7/72* (2006.01)

(52) U.S. Cl.
CPC .................................. *G06F 7/724* (2013.01)

(58) Field of Classification Search
CPC .............................. G06F 7/724; G06F 7/725
USPC ................................................. 708/491, 492
See application file for complete search history.

(56) References Cited

U.S. PATENT DOCUMENTS

| | | | |
|---|---|---|---|
| 5,787,028 A * | 7/1998 | Mullin | 708/492 |
| 6,230,179 B1 | 5/2001 | Dworkin et al. | |
| 6,266,717 B1 | 7/2001 | Dworkin et al. | |
| 6,349,318 B1 | 2/2002 | Vanstone et al. | |
| 6,618,483 B1 | 9/2003 | Vanstone et al. | |
| 6,735,611 B2 | 5/2004 | Vanstone | |
| 7,069,287 B2 | 6/2006 | Paar et al. | |
| 7,197,527 B2 | 3/2007 | Naslund et al. | |
| 7,372,960 B2 | 5/2008 | Lambert | |
| 7,724,898 B2 | 5/2010 | Naslund et al. | |
| 2002/0041682 A1* | 4/2002 | Lambert | 380/28 |
| 2005/0021584 A1* | 1/2005 | Jin et al. | 708/492 |
| 2009/0016523 A1 | 1/2009 | Dupaquis et al. | |
| 2009/0041229 A1 | 2/2009 | Douguet et al. | |
| 2009/0157788 A1* | 6/2009 | Ebeid | 708/606 |
| 2009/0180609 A1 | 7/2009 | Douguet et al. | |
| 2009/0180611 A1 | 7/2009 | Douguet et al. | |

(Continued)

FOREIGN PATENT DOCUMENTS

| | | |
|---|---|---|
| CA | 2286647 | 10/1998 |
| CA | 2265389 | 9/2000 |
| CA | 2369537 | 6/2003 |

OTHER PUBLICATIONS

International Preliminary Report on Patentability under Chapter I issued in International Application No. PCT/CA2011/050345 on Dec. 27, 2013; 6 pages.

(Continued)

*Primary Examiner* — Chuong D Ngo
(74) *Attorney, Agent, or Firm* — Fish & Richardson P.C.

(57) ABSTRACT

Methods and systems for squaring a binary finite field element are described. In some aspects, a data processing apparatus includes registers and processor logic. A first register stores a sequence of binary values that define a binary finite field element input. The processor logic accesses input components from the first register according to intervals in the sequence. Each input component includes a binary value from each interval in the sequence. In some cases, the intervals are periodic and the binary finite field element corresponds to a sum of phase-shifted input components. The processor logic generates output components based on the input components. The processor logic generates a square of the binary finite field element in the second register based on the output components. The number of input components can be selected, for example, to balance costs of additional processing time against benefits associated with reduced processing hardware.

29 Claims, 5 Drawing Sheets

(56) References Cited

U.S. PATENT DOCUMENTS

2010/0040225 A1     2/2010    Venelli et al.
2010/0220863 A1     9/2010    Dupaquis et al.

OTHER PUBLICATIONS

Alfred J. Menezes, Paul C. van Oorschot, Scott A. Vanstone, Handbook of Applied Cryptography—Chapter 2: Mathematics Background, CRC Press, 1997. 39 pages.

Alfred J. Menezes, Paul C. van Oorschot, et Scott A. Vanstone, Handbook of Applied Cryptography—Chapter 3: Number-Theoretic Reference Problems, CRC Press, 1997. 47 pages.

Alfred J. Menezes, Paul C. van Oorschot, Scott A. Vanstone, Handbook of Applied Cryptography—Chapter 4: Public-Key Parameters, CRC Press, 1997. 37 pages.

Alfred J. Menezes, Paul C. van Oorschot, Scott A. Vanstone, Handbook of Applied Cryptography—Chapter 6: Stream Ciphers, CRC Press, 1997, 33 pages.

Alfred J. Menezes, Paul C. van Oorschot, Scott A. Vanstone, Handbook of Applied Cryptography—Chapter 10: Identification and Entity Authentication, CRC Press, 1997. 41 pages.

Alfred J. Menezes, Paul C. van Oorschot, Scott A. Vanstone, Handbook of Applied Cryptography—Chapter 11: Digital Signatures, CRC Press, 1997. 65 pages.

Alfred J. Menezes, Paul C. van Oorschot, Scott A. Vanstone, Handbook of Applied Cryptography—Chapter 12: Key Establishment Protocols, CRC Press, 1997. 54 pages.

A. Murat Fiskiran and Ruby B. Lee, "Evaluating Instruction Set Extensions for Fast Arithmetic on Binary Finite Fields", Proc. Int. Conf. Application-Specific Systems, Architectures, and Processors (ASAP), pp. 125-136, Sep. 2004.

Hankerson, D. et al.; "Software Implementation of Elliptic Curve Cryptography over Binary Fields"; CHES 2000: Cryptographic Hardware and Embedded Systems; Worchester, MA; Aug. 17-18, 2000; International Workshop on Cryptographic Hardware and Embedded Systems, No. 2, vol. 1965; pp. 1-24.

Wang, C.C, et al., "VLSI Architectures for Computing Multiplications and Inverses in $GF(2^m)$," TDA Progress Report 42-75, Sep. 1983.

Jonathan Lutz, "High Performance Elliptic Curve Cryptographic Co-processor," Masters Thesis, University of Waterloo, 2003, 131 pages.

Internation Search Report and Written Opinion of the International Searching Authority issued in International Application No. PCT/CA2011/050345 on Feb. 20, 2012; 9 pages.

Corrected Written Opinion of the International Searching Authority issued in International Application No. PCT/CA2011/050345 on Feb. 22, 2012; 5 pages.

Extended European Search Report issued in European Application No. 11867225.2 on Oct. 2, 2014; 7 pages.

* cited by examiner

$B[0] \oplus = A[3]$
$B[1] \oplus = A[15]$
$B[2] \oplus = 0$
$B[3] \oplus = A[11] \oplus A[15]$
$B[4] \oplus = A[11] \oplus A[15]$
$B[5] \oplus = 0$
$B[6] \oplus = A[11] \oplus A[15]$
$B[7] \oplus = A[11]$
$B[8] \oplus = A[7]$
$B[9] \oplus = 0$
$B[10] \oplus = 0$
$B[11] \oplus = A[15]$
$B[12] \oplus = A[15]$

$B[0] \oplus = A[2]$
$B[1] \oplus = 0$
$B[2] \oplus = 0$
$B[3] \oplus = A[10]$
$B[4] \oplus = A[10]$
$B[5] \oplus = 0$
$B[6] \oplus = A[10]$
$B[7] \oplus = A[10]$
$B[8] \oplus = A[6]$
$B[9] \oplus = 0$
$B[10] \oplus = 0$
$B[11] \oplus = 0$
$B[12] \oplus = 0$

$B[0] = A[2]$
$B[1] = 0$
$B[2] = A[3]$
$B[3] = A[10]$
$B[4] = A[10]$
$B[5] = A[11]$
$B[6] = A[10] \oplus A[11]$
$B[7] = A[10]$
$B[8] = A[6] \oplus A[11]$
$B[9] = A[11]$
$B[10] = A[7]$
$B[11] = 0$
$B[12] = 0$

$B[0] = 0$
$B[1] = 0$
$B[2] = A[2]$
$B[3] = 0$
$B[4] = A[3]$
$B[5] = A[10]$
$B[6] = A[10]$
$B[7] = A[11]$
$B[8] = A[10] \oplus A[11]$
$B[9] = A[10]$
$B[10] = A[6] \oplus A[11]$
$B[11] = A[11]$
$B[12] = A[7]$

$B[0] \oplus = A[1]$
$B[1] \oplus = 0$
$B[2] \oplus = 0$
$B[3] \oplus = A[9]$
$B[4] \oplus = A[9]$
$B[5] \oplus = 0$
$B[6] \oplus = A[9]$
$B[7] \oplus = A[9]$
$B[8] \oplus = A[5]$
$B[9] \oplus = 0$
$B[10] \oplus = 0$
$B[11] \oplus = 0$
$B[12] \oplus = 0$

$B[0] = A[1]$
$B[1] = 0$
$B[2] = A[2]$
$B[3] = A[9]$
$B[4] = A[3] \oplus A[9]$
$B[5] = A[10]$
$B[6] = A[9] \oplus A[10]$
$B[7] = A[9] \oplus A[11]$
$B[8] = A[5] \oplus A[10] \oplus A[11]$
$B[9] = A[10]$
$B[10] = A[6] \oplus A[11]$
$B[11] = A[11]$
$B[12] = A[7]$

$B[0] = A[11]$
$B[1] = A[7] \oplus A[11]$
$B[2] = A[1] \oplus A[7]$
$B[3] = A[11]$
$B[4] = A[2] \oplus A[7] \oplus A[11]$
$B[5] = A[7] \oplus A[9]$
$B[6] = A[3] \oplus A[9]$
$B[7] = A[10]$
$B[8] = A[9] \oplus A[10]$
$B[9] = A[9] \oplus A[11]$
$B[10] = A[5] \oplus A[10] \oplus A[11]$
$B[11] = A[10]$
$B[12] = A[6] \oplus A[11]$

$B[0] \oplus = A[0]$
$B[1] \oplus = A[12]$
$B[2] \oplus = 0$
$B[3] \oplus = A[8] \oplus A[12]$
$B[4] \oplus = A[8] \oplus A[12]$
$B[5] \oplus = 0$
$B[6] \oplus = A[8] \oplus A[12]$
$B[7] \oplus = A[8]$
$B[8] \oplus = A[4]$
$B[9] \oplus = 0$
$B[10] \oplus = 0$
$B[11] \oplus = A[12]$
$B[12] \oplus = A[12]$

$B[0] = A[0] \oplus A[11]$
$B[1] = A[7] \oplus A[11] \oplus A[12]$
$B[2] = A[1] \oplus A[7]$
$B[3] = A[8] \oplus A[11] \oplus A[12]$
$B[4] = A[2] \oplus A[7] \oplus A[8] \oplus A[11] \oplus A[12]$
$B[5] = A[7] \oplus A[9]$
$B[6] = A[3] \oplus A[8] \oplus A[9] \oplus A[12]$
$B[7] = A[8] \oplus A[10]$
$B[8] = A[4] \oplus A[9] \oplus A[10]$
$B[9] = A[9] \oplus A[11]$
$B[10] = A[5] \oplus A[10] \oplus A[11]$
$B[11] = A[10] \oplus A[12]$
$B[12] = A[6] \oplus A[11] \oplus A[12]$.

$B[0] \oplus = A[3] \oplus A[163]$
$B[1] \oplus = A[163]$
$B[2] \oplus = 0$
$B[3] \oplus = A[163]$
$B[4] \oplus = A[163]$
$B[5] \oplus = A[87]$
$B[6] \oplus = A[163]$
$B[7] \oplus = 0$
$B[8] \oplus = A[7] \oplus A[87] \oplus A[163]$
$B[9] \oplus = 0$
$B[10] \oplus = 0$
$B[11] \oplus = A[87]$
$B[12] \oplus = A[87]$
$B[13] \oplus = A[91]$
$B[14] \oplus = 0$
$B[15] \oplus = 0$
$B[16] \oplus = A[11] \oplus A[91]$
$B[17] \oplus = 0$
$B[18] \oplus = 0$
$B[19] \oplus = A[91]$
$B[20] \oplus = A[91]$
$B[21] \oplus = A[95]$
$B[22] \oplus = 0$
$B[23] \oplus = 0$
$B[24] \oplus = A[15] \oplus A[95]$
$B[25] \oplus = 0$
$B[26] \oplus = 0$
$B[27] \oplus = A[95]$
$B[28] \oplus = A[95]$
$B[29] \oplus = A[99]$
$B[30] \oplus = 0$
$B[31] \oplus = 0$
$B[32] \oplus = A[19] \oplus A[99]$
$B[33] \oplus = 0$
$B[34] \oplus = 0$
$B[35] \oplus = A[99]$
$B[36] \oplus = A[99]$
$B[37] \oplus = A[103]$
$B[38] \oplus = 0$
$B[39] \oplus = 0$
$B[40] \oplus = A[23] \oplus A[103]$ $B[41] \oplus = 0$
$B[42] \oplus = 0$
$B[43] \oplus = A[103]$
$B[44] \oplus = A[103]$
$B[45] \oplus = A[107]$
$B[46] \oplus = 0$
$B[47] \oplus = 0$
$B[48] \oplus = A[27] \oplus A[107]$
$B[49] \oplus = 0$
$B[50] \oplus = 0$
$B[51] \oplus = A[107]$
$B[52] \oplus = A[107]$
$B[53] \oplus = A[111]$
$B[54] \oplus = 0$
$B[55] \oplus = 0$
$B[56] \oplus = A[31] \oplus A[111]$
$B[57] \oplus = 0$
$B[58] \oplus = 0$
$B[59] \oplus = A[111]$
$B[60] \oplus = A[111]$
$B[61] \oplus = A[115]$
$B[62] \oplus = 0$
$B[63] \oplus = 0$
$B[64] \oplus = A[35] \oplus A[115]$
$B[65] \oplus = 0$
$B[66] \oplus = 0$
$B[67] \oplus = A[115]$
$B[68] \oplus = A[115]$
$B[69] \oplus = A[119]$
$B[70] \oplus = 0$
$B[71] \oplus = 0$
$B[72] \oplus = A[39] \oplus A[119]$
$B[73] \oplus = 0$
$B[74] \oplus = 0$
$B[75] \oplus = A[119]$
$B[76] \oplus = A[119]$
$B[77] \oplus = A[123]$
$B[78] \oplus = 0$
$B[79] \oplus = 0$
$B[80] \oplus = A[43] \oplus A[123]$
$B[81] \oplus = 0$ $B[82] \oplus = 0$
$B[83] \oplus = A[123]$
$B[84] \oplus = A[123]$
$B[85] \oplus = A[127]$
$B[86] \oplus = 0$
$B[87] \oplus = 0$
$B[88] \oplus = A[47] \oplus A[127]$
$B[89] \oplus = 0$
$B[90] \oplus = 0$
$B[91] \oplus = A[127]$
$B[92] \oplus = A[127]$
$B[93] \oplus = A[131]$
$B[94] \oplus = 0$
$B[95] \oplus = 0$
$B[96] \oplus = A[51] \oplus A[131]$
$B[97] \oplus = 0$
$B[98] \oplus = 0$
$B[99] \oplus = A[131]$
$B[100] \oplus = A[131]$
$B[101] \oplus = A[135]$
$B[102] \oplus = 0$
$B[103] \oplus = 0$
$B[104] \oplus = A[55] \oplus A[135]$
$B[105] \oplus = 0$
$B[106] \oplus = 0$
$B[107] \oplus = A[135]$
$B[108] \oplus = A[135]$
$B[109] \oplus = A[139]$
$B[110] \oplus = 0$
$B[111] \oplus = 0$
$B[112] \oplus = A[59] \oplus A[139]$
$B[113] \oplus = 0$
$B[114] \oplus = 0$
$B[115] \oplus = A[139]$
$B[116] \oplus = A[139]$
$B[117] \oplus = A[143]$
$B[118] \oplus = 0$
$B[119] \oplus = 0$
$B[120] \oplus = A[63] \oplus A[143]$
$B[121] \oplus = 0$
$B[122] \oplus = 0$ $B[123] \oplus = A[143]$
$B[124] \oplus = A[143]$
$B[125] \oplus = A[147]$
$B[126] \oplus = 0$
$B[127] \oplus = 0$
$B[128] \oplus = A[67] \oplus A[147]$
$B[129] \oplus = 0$
$B[130] \oplus = 0$
$B[131] \oplus = A[147]$
$B[132] \oplus = A[147]$
$B[133] \oplus = A[151]$
$B[134] \oplus = 0$
$B[135] \oplus = 0$
$B[136] \oplus = A[71] \oplus A[151]$
$B[137] \oplus = 0$
$B[138] \oplus = 0$
$B[139] \oplus = A[151]$
$B[140] \oplus = A[151]$
$B[141] \oplus = A[155]$
$B[142] \oplus = 0$
$B[143] \oplus = 0$
$B[144] \oplus = A[75] \oplus A[155]$
$B[145] \oplus = 0$
$B[146] \oplus = 0$
$B[147] \oplus = A[155]$
$B[148] \oplus = A[155]$
$B[149] \oplus = A[159]$
$B[150] \oplus = 0$
$B[151] \oplus = 0$
$B[152] \oplus = A[79] \oplus A[159]$
$B[153] \oplus = 0$
$B[154] \oplus = 0$
$B[155] \oplus = A[159]$
$B[156] \oplus = A[159]$
$B[157] \oplus = A[163]$
$B[158] \oplus = 0$
$B[159] \oplus = 0$
$B[160] \oplus = A[83] \oplus A[163]$
$B[161] \oplus = 0$
$B[162] \oplus = 0$

FIG. 5 ued States Patent No. US 9,128,806 B2

SQUARING BINARY FINITE FIELD ELEMENTS

CROSS-REFERENCE TO RELATED APPLICATIONS

This application claims the benefit of PCT Application Serial No. PCT/CA2011/050345 entitled "Squaring Binary Finite Field Elements," filed on Jun. 6, 2011, the entire contents of which is hereby incorporated by reference.

BACKGROUND

This specification relates to squaring binary finite field elements. Binary finite field arithmetic operations are used in elliptic curve cryptography systems and other applications. For example, a coordinate of an elliptic curve point can be represented as a binary finite field element, and binary finite field arithmetic can be used to perform calculations based on the coordinates. Embedded hardware devices are often used to perform intensive binary finite field operations, such as multiplication, squaring, and inversion. Some embedded hardware devices perform binary squaring in a single cycle.

BRIEF DESCRIPTION OF THE DRAWINGS

FIGS. 4A-4K are tables showing operations in an example squaring algorithm for binary finite fields.

FIG. 5 is a table showing operations in another example squaring algorithm for binary finite fields.

Like reference numbers and designations in the various drawings indicate like elements.

DETAILED DESCRIPTION

A squaring algorithm that allows an adjustable tradeoff between the time required to execute the squaring operation and the hardware required to implement the squaring operation allows the algorithm to be tuned for particular applications or deployments. Devices that efficiently perform binary finite field arithmetic operations may be useful in a number of different contexts. As an example, embedded or specialized cryptographic hardware can be used in cryptographic systems employing binary finite field based elliptic curve cryptographic (ECC) implementations. Such hardware can be used for intensive binary field operations, such as, for example, finite field multiplication, squaring, and possibly other operations. Multiplication can be executed efficiently as a result of the lack of carry propagation in the binary-polynomial based representation often used for binary field ECC. Squaring in this same representation (i.e. multiplying a binary finite field element by itself) can be even more time-efficient in some instances but may require additional hardware gates and wiring.

In some implementations, hardware deployed for serialized multiplication can be used for squaring operations, which can reduce the amount of additional hardware needed for the squaring operation. For example, the number of additional XOR gates deployed for squaring operations can be reduced without greatly impeding the speed of the squaring operation. In some instances, the squaring operation is still much faster than serialized multiplication. As a particular example (shown in FIG. 5), the squaring operation can be performed in four clock cycles, whereas some conventional multiplication operations would require forty-one clock cycles.

Figure 1A:
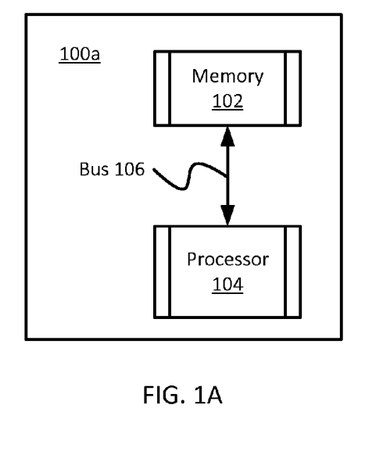
FIG. 1A is a schematic diagram showing aspects of an example computing system.
Figure 1B:
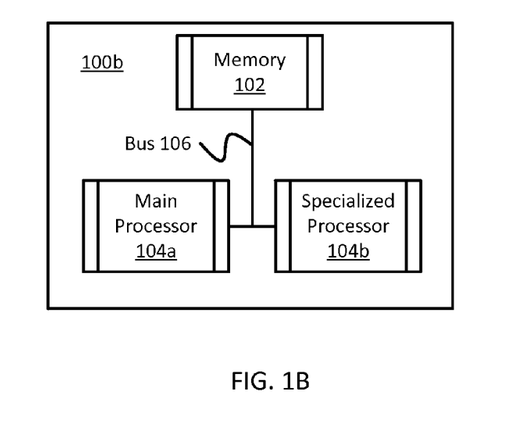
FIG. 1B is a schematic diagram showing aspects of an example computing system.

FIG. 1A is a schematic diagram showing aspects of an example computing system 100a. The example computing system 100a includes a memory 102 and a processor 104 communicably coupled by a bus 106. FIG. 1B is a schematic diagram showing aspects of another example computing system 100b. The example computing system 100b includes a memory 102, a main processor 104a, and a specialized processor 104b coupled by a bus 106. The example computing systems 100a, 100b may each include additional or different features. For example, the computing systems 100a, 100b may include a user interface, a data interface, input/output controllers, a storage device, additional or different types of memories or processors, or combinations of these and other features. The techniques described herein may be implemented by additional or different types of information systems.

In some implementations, the computing system 100a, the computing system 100b, or both can be, or can be included in, a mobile device. Example mobile devices include handheld devices such as a smart phones, personal digital assistants (PDAs), portable media players, tablets, and other. In some implementations, either of the example computing systems 100a, 100b can be, or can be included in, another type of system. For example, in some implementations either of the computing systems 100a, 100b can be included in consumer electronics, personal computing systems, consumer appliances, transportation systems, manufacturing systems, security systems, medical systems, and others.

In some instances, the computing system 100a, the computing system 100b, or both can include a user interface capable of receiving input from a user, providing output to a user, or both. For example, a user interface may include a touchscreen, a pointing device, a trackball, a keypad, a microphone, or another type of interface. A user interface can include a sensor or transducer that detects user interaction and converts the user interaction to voltage or current on a data bus or another medium.

In some instances, the computing system 100a, the computing system 100b, or both can include a data communication interface. In some implementations, the data communication interface can receive and transmit data in analog or digital form over communication links such as a serial link, wireless link (e.g., infrared, radio frequency, etc.), parallel link, or another type of link. The data communication interface allows the computing system to communicate with external components or systems. For example, a communication link may allow the computing system to communicate with a cellular network, a local area network, an accessory or component, or another external system.

The memory 102 (of the computing system 100a or the computing system 100b) can include any type of data storage media. The memory 102 may include volatile memory, non-volatile memory, or any combination of these and other types of storage media. The memory 102 can include, for example, a random access memory (RAM), a storage device (e.g., a writable read-only memory (ROM), etc.), a hard disk, or another type of storage medium. The memory 102 can store instructions (e.g., computer code) associated with computer applications, programs and computer program modules, and other resources. The memory 102 can store application data and data objects that can be interpreted by applications, programs, modules, or virtual machines running on the computing system.

The memory 102 can be implemented as one or more hardware structures. In some implementations, the memory 102 includes a primary memory structure (e.g., a dynamic RAM) and a secondary memory structure (e.g., a static RAM). As such, in FIG. 1A, data may be loaded to and from the processor 104 over the bus 106 by a main memory, by a buffer or cache memory, or by another type of memory. Similarly, in FIG. 1B, data may be loaded to and from the specialized processors 104b over the bus 106 by the main processor 104a, by a main memory, by a buffer or cache memory, etc. The bus 106 can include a single data bus or multiple independent data buses.

The processor 104 of the computing system 100a in FIG. 1A can include any type of data processing apparatus. For example, the processor 104 can include a general purpose processor, special purpose logic circuitry (e.g., an FPGA (field programmable gate array) or an ASIC (application specific integrated circuit)), or any other type of data processing apparatus. The processor may include a primary processor (such as the main processor 104a of FIG. 1B), one or more co-processors (such as the specialized processors 104b of FIG. 1B), or a combination of these and other types of data processing apparatus. In some examples, the processor 104 is a general purpose processor that evaluates binary finite field operations by executing or interpreting software, scripts, functions, executables, and other types of computer program code. In some examples, the processor 104 is a binary finite field arithmetic processor that includes digital circuitry configured to perform specified operations. For example, the processor 104 in FIG. 1A can be the example processor 200 of FIG. 2 or another type of processor.

The main processor 104a in FIG. 1B can include any type of data processing apparatus that controls one or more aspects of operation on the computing system 100b. In some implementations, the main processor 104a is a general purpose microprocessor that can run applications and programs by executing or interpreting software, scripts, functions, executables, and other types of computer program code. The main processor 104a can be programmed to control operation of the computing system 100b. For example, the computing system 100b may include an operating system, a virtual machine, or another type of device platform executed by the computing system 100b. The main processor 104a can control operation of the computing system 100b in an additional or different manner. A computing system can include multiple main processors 104a. The main processor 104a can be implemented as one or more hardware structures of the computing system 100b.

The main processor 104a can control one or more other components of the computing system 100b. For example, the main processor 104a may access information on the memory 102 and store information to the memory 102, the main processor 104a may invoke the specialized processors 104b to performed specialized functions, the main processor 104a may interact with a user interface to receive input provided by a user, or the main processor 104a may perform a combination of these and other types of functions. The main processor 104a can operate as a master component that invokes, calls, or otherwise controls the operation of one or more other components of the computing system 100b. Some aspects or components of the computing system 100b may operate autonomously or may be controlled by a different component, other than the main processor 104a.

The specialized processors 104b can include any type of data processing apparatus configured to supplement functionality of the main processor 104a. For example, the specialized processors 104b may be configured to provide computationally-intensive functionality when invoked by the main processor 104a. The specialized processors 104b can include one or more co-processors or another type of data processing apparatus. A co-processor can include hardware, firmware, or other features configured to execute a class of operations or a class of functions faster or otherwise more efficiently than the main processor 104a. The specialized processors 104b can include a multimedia co-processor, a cryptographic co-processor, an arithmetic co-processor or a combination of these and other co-processors. Each of the specialized processors 104b can be implemented as one or more hardware structures of the computing system 100b. In some implementations, the specialized processors 104b can run independently of the main processor 104a. In some examples, one or more of the specialized processors 104b is a binary finite field arithmetic processor that includes digital circuitry configured to perform specified operations. For example, the specialized processors 104b in FIG. 1B can include the example processor 200 of FIG. 2 or another type of processor.

Operation of the specialized processors 104b can be supervised or otherwise controlled by the main processor 104a. The main processor 104a can offload computationally-intensive tasks to the specialized processors 104b, for example, to improve system performance. Offloading tasks to the specialized processors 104b can allow the main processor 104a to perform other tasks, and in some cases the offloaded task is performed faster by the specialized processors 104b than by the main processor 104a. In some implementations, the specialized processors 104b are programmed or configured to perform a more limited range of specialized tasks than the main processor 104a. Moreover, the specialized processors 104b may have more limited control over other components of the computing system 100b, as compared to the main processor 104a. A specialized processor may be configured in a master-slave relationship with the main processor 104a.

The main processor 104a and a specialized processor 104b can be implemented as two or more separate structures, two or more components of a common structure, a single integrated structure, or otherwise, as appropriate. The main processor 104a and one or more specialized processors 104b may reside on the same die or on multiple different dies. In some example implementations, the main processor 104a or main control can be implemented as a hardwired state machine that controls the operation of one or more specialized processors 104b. In such example implementations, the hardwired state machine can also control other functions or modules, for example, external communication. Such implementation can be useful in a variety of contexts, for example, small devices used for authentication or other cryptographic operations.

In some cases, the computing device 100a or the computing device 100b can be an authentication device that is embedded in, integrated with, or otherwise associated with a product to be authenticated. The authentication device may contain, for example, authentication data (e.g., a secret key value, certificate data, etc.) that can be used to establish the authenticity of the product. Some example authentication devices include a response-generator module operable to generate a response based on the authentication data stored on the authentication device and a challenge received from an interrogator device. In some instances, the response-generator module uses a cryptographic key based on ECC, RSA, AES, DES, or another type of encryption scheme. In such examples, one or more of the processors shown in FIGS. 1A and 1B can be hardwired, programmed, or otherwise configured to perform some or all of the cryptographic operations used to generate the response. Authentication devices can include additional or different features and may operate in a different manner, as appropriate.

The example computing systems 100a, 100b shown in FIGS. 1A and 1B can perform binary finite field arithmetic operations. In particular, the example computing systems 100a, 100b can each perform squaring operations on a binary finite field element. Binary finite field arithmetic can be performed in a variety of contexts and applications, and for a variety of purposes. In some instances, binary finite field arithmetic operations are performed in relation to a cryptographic scheme. Accordingly, in some instances the example computing systems 100a, 100b can be configured to implement aspects of a cryptographic scheme. For example, the memory 102 may store data and instructions associated with a cryptographic scheme, and one or more of the processors 104, 104a, 104b may be programmed to perform cryptographic operations or evaluate cryptographic functions. In some instances, cryptographic operations may include one or more operations of a certificate authority, of an encryption scheme, of a digital signature scheme, or combinations of these and other types of operations. As a specific example, in some implementations either of the example computing systems 100a, 100b may be programmed to perform aspects of an elliptic curve cryptography (ECC) scheme.

The processor 104 in FIG. 1A and the specialized processor 104b in FIG. 1B are configured to perform a binary finite field squaring operations. The squaring operation can be implemented, in some cases, with fewer hardware resources than would be required by some conventional squaring operations and in less time than would be required by some conventional multiplication operations. Moreover, aspects or parameters of the squaring operation may be selected in a manner that optimizes, balances, or otherwise considers the hardware costs and time costs associated with squaring a binary finite field element. As such, the squaring operation may, in some instances, bring down hardware costs over conventional squaring operations and retain some time efficiency over multiplication.

A binary finite field squaring operation receives as input a first binary finite field element and generates as output another binary finite field element that is a square of the input. A binary finite field element can generally be represented (e.g., in memory) as a sequence of binary values (ones and zeros). Binary finite field elements are often expressed as a polynomial representation $A(x)$. For example, the sequence of binary values can represent binary coefficients for the successive powers of x in the polynomial. In particular, each binary value in the sequence can represent the coefficient for one of the powers of x in the polynomial.

A binary finite field can be defined by parameters including a reduction polynomial. As such, binary finite field arithmetic can include a reduction operation. The reduction operation applied to a binary finite field polynomial $A(x)$ can be expressed $A(x) \bmod f(x)$, where $f(x)$ represents an irreducible reduction polynomial. Other representations may also be used.

In the polynomial representation, the input binary finite field element can be represented $$A(x)=a_0x^0+\ldots+a_{n-1}x^{n-1}. \tag{1}$$

The polynomial can be considered the sum of g polynomials in x having gap g between successive powers of x. To perform the squaring operation, each of the g polynomials can be processed as an individual input component. As such, the input binary finite field element corresponds to a sum of the input components, and the squaring operation can be performed by serializing operations over the input components. In some implementations, one or more aspects of the serialized operation can be implemented by hardware that are already present on the data processing apparatus for multiplication operations. Accordingly, fewer specialized hardware resources are required for the squaring operation in some cases.

Multiple input components can be defined based on partitioning the input binary finite field element A into multiple polynomials each having a gap between successive powers. For example, with a gap of four, A can be divided into four input components as shown in Table 1, where each column corresponds to an individual input component.

TABLE 1

| $a_0x^0$ | $+a_1x^1$ | $+a_2x^2$ | $+a_3x^3$ |
|---|---|---|---|
| $+a_4x^4$ | $+a_5x^5$ | $+a_6x^6$ | $+a_7x^7$ |
| $+a_8x^8$ | $+a_9x^9$ | $+a_{10}x^{10}$ | $+a_{11}x^{11}$ |
| $+a_{12}x^{12}$ | $+a_{13}x^{13}$ | $+a_{14}x^{14}$ | $+a_{15}x^{15}$ |
| $+\ldots$ | $+\ldots$ | $+\ldots$ | $+\ldots$ |

Each row in Table 1 defines an interval that includes four successive terms of the polynomial A, and each input component includes one term from each of the intervals. As such, each of the intervals can include consecutive terms in the polynomial. In the example shown in Table 1, the first interval includes the terms having coefficients $a_0$, $a_1$, $a_2$, and $a_3$, the second interval includes the terms having coefficients $a_4$, $a_5$, $a_6$, and $a_7$, etc. The input components can include a term from each interval, and thus may include non-consecutive terms in the polynomial. In the example shown in Table 1, an input component includes the terms having coefficients $a_0$, $a_4$, $a_8$, $a_{12}$, etc.; another input component includes the terms having coefficients $a_1$, $a_5$, $a_9$, $a_{13}$, etc.

The intervals can define a period, for example, where each interval is the same length (e.g., a length of g=4 in Table 1). In some instances, one or more of the intervals (e.g., the final interval in the sequence) may include fewer terms, and the other intervals define the period. In some examples where the intervals define a period, each input component is defined by the period and a phase shift for the component (e.g., a phase shift corresponding to the column that defines the input component in a table representation such as Table 1). In the example shown in Table 1, the first column defines an input component $A_0(x^4)$, where $$A_0(x^4)=a_0+a_4x^4+a_8x^8+\ldots. \tag{2}$$

The second column, once x is factored out, defines an input component $A_1(x^4)$, where $$xA_1(x^4)=a_1x+a_5x^5+a_9x^9+\ldots. \tag{3}$$

The third column, once $x^2$ is factored out, defines an input component $A_2(x^4)$, where $$x^2A_2(x^4)=a_2x^2+a_6x^6+a_{10}x^{10}+\ldots. \tag{4}$$

A similar process may be used to define all g polynomials $A_i$ which can be summed with appropriate factors of x to form $A(x)$. As such, the input $A(x)$ can correspond to a sum of phase-shifted polynomials. In the example decomposition of $A(x)$ above, $$A(x)=A_0(x^4)+xA_1(x^4)+x^2A_2(x^4)+x^3A_3(x^4) \bmod f(x). \tag{5}$$

Accordingly, $A_i(x^4)$ are polynomials each having fewer terms than $A(x)$ (roughly 1/g as many). In some hardware implementations, as described in more detail below, this decomposition can be accomplished by tapping every $g^{th}$ bit of the input register. In the example above, the decomposition can be accomplished by tapping every fourth bit of the input register storing the coefficients of A(x). When a larger gap g is employed, the resulting decomposition will contain a larger number of input components $A_i(x^4)$. In binary finite fields, squaring is linear, so the decomposition above implies that:

$$A(x)^2 = A_0(x^8) + x^2 A_1(x^8) + x^4 A_2(x^8) + x^6 A_3(x^8) \bmod f(x) \quad (6)$$

where now $A_i(x^8)$ will can be reduced by f(x).

The decomposition into g input components may be used to compute $A(x)^2$ iteratively. In some implementations the contribution of each output component $A_i(x^8)$ can be calculated separately. In other words, an output component $A_i(x^8)$ can be generated for each input component $A_i(x^4)$. The output components $A_i(x^8)$ can be stored in an output register, and the values in the output register can be shifted by $x^{2i}$ in the output register to account for the $x^{2i}$ factored out in the decomposition. More generally, in some implementations, for a gap size g an input component can be expressed $A_i(x^g)$ and the corresponding output component can be expressed $A_i(x^{2g})$.

In some implementations, additional or different input components or output components may be appropriate.

In some implementations, hardware for performing squaring operations are deployed on a device along with hardware for performing multiplication operations. Multiplication operations are often implemented using "accumulation XOR gates." These accumulation XOR gates can also be used to generate the output components (e.g., the output components $A_i(x^8)$ described above) in a squaring operation. Moreover, structures that implement serialized multiplication operations may include shift logic and reduction logic. As such, this processor logic can also be used to shift and reduce output values generated during a squaring operation. Accordingly, in some implementations, the squaring operation can be implemented at least in part using hardware that can also be used for performing multiplication operations.

Alternative squaring operations may require additional hardware that is not used in serialized multiplication operations. For example, some squaring operations that are performed in a single clock cycle (given a fixed irreducible polynomial) combine the expansion and reduction components of the binary squaring operation into circuits that define the new contents of the register in terms of XOR functions of the register's previous contents. The form of the XOR functions are determined from the chosen irreducible polynomial used to define the binary finite field. The XOR functions used in such single-cycle squaring operation do not utilize the accumulation XOR gates that are deployed for serialized multiplication.

As an example, the following irreducible polynomial can be used:

$$f(x) = x^{163} + x^7 + x^6 + x^3 + 1 \quad (7)$$

In some instances, if the binary finite field element A(x) is received in a 163 bit register, then the equivalent of 252 two-input XOR gates are used to perform the squaring operation in one cycle. The single-cycle squaring can be performed faster than a multi-cycle serialized multiplication. For example, performing a serialized multiplication on a binary finite field element in a 163 bit register, if serialized to four bits of multiplier at a time, may take roughly forty-one cycles to perform. As such, a squaring operation that uses the hardware for serialized multiplication to perform squaring in roughly four cycles can reduce hardware costs with respect to single-cycle squaring and reduce time costs with respect to serialized multiplication. In some implementations, this may allow a more hardware-efficient deployment of cryptographic schemes (e.g., elliptic curve cryptography) that employ the squaring calculation.

In one aspect of operation, the computing system 100a of FIG. 1A calculates the square of a binary finite field element. An input binary finite field element is loaded to the processor 104 from the memory 102 over the bus 106. Depending on the size of the bus 106, the input binary finite field element may be loaded over multiple clock cycles. The processor 104 calculates the square of the input binary finite field element. The processor 104 calculates the square by dividing the input binary finite field element into multiple input components and serially processing the input components. As such, the processor 104 generates the square over multiple clock cycles, and the number of clock cycles is related to the number of input components (i.e., the gap size g). The processor 104 outputs the square of the binary finite field element to the memory 102 over the bus 106. Depending on the size of the bus 106, the output binary finite field element (i.e., the square) may be output over multiple clock cycles.

In one aspect of operation, the computing system 100b of FIG. 1B calculates the square of a binary finite field element. An input binary finite field element can be loaded to one of the specialized processors 104b from the main processor 104a over the bus 106, or from the memory 102 over the bus 106. Depending on the size of the bus 106, the input binary finite field element may be loaded over multiple clock cycles. The specialized processor 104b calculates the square by dividing the input binary finite field element into multiple input components and serially processing the input components over multiple clock cycles. The specialized processor 104b outputs the square of the binary finite field element to the main processor 104a over the bus 106, or to the memory 102 over the bus 106. Depending on the size of the bus 106, the output binary finite field element (i.e., the square) may be output over multiple clock cycles.

Figure 2:
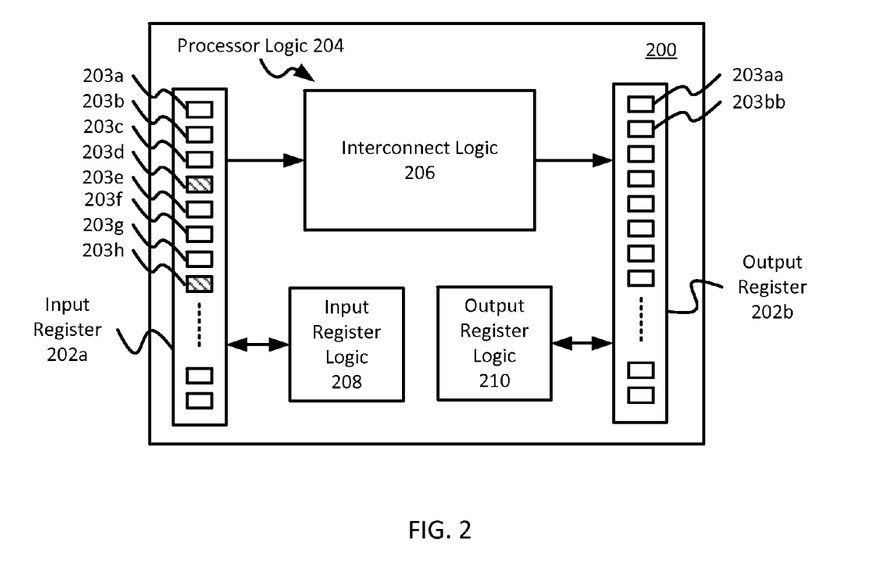
FIG. 2 is a schematic diagram showing aspects of an example data processing apparatus.

FIG. 2 is a schematic diagram showing aspects of an example processor 200. The example processor 200 includes an input register 202a, an output register 202b and processor logic 204. The processor 200 may include additional or different types of registers, additional or different types of logic, and other types of features or components. The registers can be of any suitable size and configuration. The processor logic 204 includes interconnect logic 206, input register logic 208, output register logic 210, and possibly other types of logic. In the example processor 200 shown in FIG. 2, the processor logic 204 is implemented in hardware. The processor logic 204 can include hardwired digital circuitry and logic gates, dynamically reconfigurable components, programmable or re-programmable components, or a combination of these and other types of processor logic components.

The input register 202a includes multiple input register locations 203a, 203b, 203c, etc. In the example input register 202a shown in FIG. 2, each of the input register locations stores one bit. An input binary finite field element of length n can be stored at the input register 202a by writing the sequence binary coefficients $a_i$ of the polynomial representation to input register locations. An input binary finite field element can be received over multiple clock cycles. For example, placing a 163-bit element in the register over a 32-bit bus can take six cycles in some implementations. The binary finite field element defines an order for the sequence of binary values (i.e., $a_0, a_1, a_2, \ldots a_{n-1}$). However, the binary values in the sequence may be received, stored, or manipulated in any appropriate time order or any appropriate spatial arrangement. Accordingly, a sequence of binary values can be stored as a group of binary values in any appropriate arrangement or configuration in the input register 202a.

The input register logic 208 can perform operations on the binary values stored in the input register 202a. For example, in some instances the input register logic 208 can access values from the input register 202a, generate an output values, and store the output values in the input register 202a in a single clock cycle. The input register logic 208 may include processor logic operable to shift or otherwise rearrange the binary values among the locations in the input register 202a. The input register logic 208 may include processor logic operable to reduce a binary finite field element in the input register 202a, for example, by an irreducible polynomial.

The interconnect logic 206 can access input values stored in the input register 202a, generate an output values based on the input values, and store the output values in the output register 202b. For example, the interconnect logic 206 may access multiple input components of a binary finite field element stored in the input register 202a, generate an output component for each of the input components, and store each output component in the output register 202b.

In some implementations, the interconnect logic 206 can include taps at one or more of the input register locations. A tap at a particular register location allows the interconnect logic 206 to read the binary value stored in that particular register location. In the particular example shown in FIG. 2, every fourth register location is tapped; two of the tapped register locations 203d and 203h are hatched in the figure. Additional or different register locations can be tapped register locations.

The tapped register locations may represent intervals in the sequence of binary values. For example, each of the intervals may include consecutive values in the binary sequence. In the example shown in FIG. 2, the tapped register locations define intervals of length four (i.e., g=4). In particular, the tapped register location 203d defines a first interval that includes the values stored at the input register locations 203a, 203b, 203c, and 203d; the tapped register location 203h defines a second interval that includes the values stored at the input register locations 203e, 203f, 203g, and 203h; etc. As a specific example, the first interval may include the values $a_0$, $a_1$, $a_2$, and $a_3$, and the second interval may include the values $a_4$, $a_5$, $a_6$, and $a_7$. In some implementations, the tapped register locations define additional or different size intervals. The same tap may be used to access all of the binary values in each interval, for example, by shifting the values in the input register 202a.

In the present discussion, the notation A[i] can represent the $i^{th}$ binary value in the sequence $a_0$, $a_1$, $a_2$, ... $a_{n-1}$, or an input register location that stores the $i^{th}$ binary value in the sequence. As such, A[i] may refer to a binary coefficient $a_i$ or an input register location that stores the binary coefficient $a_j$, as appropriate. For example, when the binary value $a_1$ is stored in the input register location 203b, the input register location 203b can be referred to as register location A[1], and when the binary value $a_1$ is stored in the input register location 203a, the input register location 203a can be referred to as register location A[1].

In some implementations, the interconnect logic 206 can accesses the input components by reading the binary values at the tapped register locations. In cases where each interval includes consecutive values in the sequence and each the input component includes a term from each interval, the input components include non-consecutive values in the sequence. For example, when intervals of length four are used, the input component $A_3(x^4)$ can be accessed by reading the binary values at the register locations . . . A[11], A[7], A[3]. As another example, when intervals of length five are used, the input component $A_4(x^5)$ can be accessed by reading the binary values at the register locations: . . . A[14], A[9], A[4].

In some implementations, after accessing an input component the interconnect logic 206 can generate an output component based on the input component. For example, the interconnect logic 206 may generate the output component $A_3(x^8)$ based on the input component $A_3(x^4)$, the interconnect logic 206 may generate the output component $A_2(x^8)$ based on the input component $A_2(x^4)$; etc. More generally, in some implementations, the interconnect logic 206 can map each of the input components $A_i(x^g)$ to an appropriate output component $A_i(x^{2g})$. This operation may be described, for example, as an unreduced linear squaring operation, or an expansion with interleaved zeros.

In some implementations, the interconnect logic 206 can generate the output component for each input component based on the binary values that define the input component and the binary values stored in the output register 202b. For example, the interconnect logic 206 can include accumulation gates, such as, for example, accumulation XOR gates or other types of accumulation gates. An accumulation XOR gate can be configured to perform an exclusive-or operation based on binary input values from an input register location and an output register location, and write the binary output value to the output register location that provided one of the binary input values. An accumulation XOR gate can be represented by the symbol "⊕=". For example, B[1]⊕=A[1] represents an accumulation XOR gate that stores the value B[1]⊕A[1] at the register location B[1].

Accordingly, the interconnect logic 206 may generate the output components by accumulating the output components into the output register 202b. For example, the interconnect logic may accumulate the output component $A_3(x^8)$ into the output register 202b based on the input component $A_3(x^4)$; the processor logic may accumulate the output component $A_2(x^8)$ into the output register 202b based on the input component $A_2(x^4)$; etc.

The output register 202b includes multiple output register locations 203aa, 203bb, etc. In the example output register 202b shown in FIG. 2, each of the output register locations stores one bit. The sequence of binary values in the output register 202b can represent a binary finite field element of length n. In some instances, the binary finite field element represented by the binary values in the output register corresponds to the square of an input binary finite field element received by the input register 202a. An output binary finite field element can be outputted from the output register 202b. An output binary finite field element can be outputted over multiple clock cycles. A binary finite field element defines an order for the sequence of binary values, and the binary values in the sequence may be received, stored, or manipulated in any appropriate time order or any appropriate spatial arrangement. Accordingly, a sequence of binary values can be stored as a group of binary values in any appropriate arrangement or configuration in the output register 202b.

The output register logic 210 can perform operations on the binary values stored in the output register 202b. For example, in some instances the output register logic 210 can access values from the output register 202b, generate an output values, and store the output values in the output register 202b in a single clock cycle. The output register logic 210 may include processor logic operable shift or otherwise rearrange the binary values among the locations in the output register 202b. The output register logic 210 may include processor logic operable to reduce a binary finite field element in the input register 202b, for example, by an irreducible polynomial.

In some aspects of operation, the processor logic 204 generates the square of a binary finite field element by a serialized process. Aspects of the serialized process be implemented by an iterative technique. Each iteration can include accessing an input component from the input register 202a, generating an output component based on the input component, storing the output component in the output register 202b. Some or all the iterations may include manipulating (e.g., shifting, reducing, etc.) the binary values in the input register 202a, manipulating (e.g., shifting, reducing, etc.) the binary values in the output register 202b, or a combination of these and other operations.

Some aspects of operation of the processor 200 are illustrated by the following example. The processor 200 can calculate a square of a binary finite field element by defining g input components of the binary finite field element. The following example utilizes four input components based on intervals of size four (i.e., g=4). First, the interconnect logic 206 accesses the first input component $A_3(x^4)$ by reading the binary values at register locations . . . A[11], A[7], A[3] (at the tapped register locations 203d, 203h, etc.) in the input register 202a. Next, the interconnect logic 206 accumulates the output component $A_3(x^8)$mod f(x) to the output register 202b. The output register logic 210 shifts the binary values in the output register 202b are by a factor of $x^2$ and reduces the resulting field element by f(x). In some implementations, the accumulation, shift and reduction can be accomplished in one clock cycle, for example, by hardware that can also be used in serialized multiplication. In some implementations, the operations are performed in multiple clock cycles. For example, the shifting, the reduction, or both may be performed after the accumulation.

Continuing the example case, the input register logic 208 shifts the values in the input register 202a so that the coefficients of $A_2(x^4)$ are available at the tapped register locations. In some cases the binary values in the register are all shifted by one position in the input register 202a. As a particular example, the coefficient $a_0$ can be shifted from the register location 203a to the register location 203b, the coefficient $a_1$ can be shifted from the register location 203b to the register location 203c, and the coefficient $a_2$ can be shifted from the register location 203c to the tapped register location 203d.

Continuing the example case, the processor logic 204 can process the second input component $A_2(x^4)$ using the same operations that were used to process the first input component $A_3(x^4)$. In particular, the interconnect logic 206 accesses the second input component $A_2(x^4)$ by reading the binary values at register locations . . . A[10], A[6], A[2] (which are the tapped register locations 203d, 203h, etc. as a result of the shifting) in the input register 202a. Next, the interconnect logic 206 accumulates the output component $A_2(x^8)$mod f(x) to the output register 202b. The output register logic 210 shifts the binary values in the output register 202b are by a factor of $x^2$ and reduces the resulting field element by f(x). The processor logic 204 can process the third input component $A_1(x^4)$ using the same operations that were used to process the first input component $A_3(x^4)$ and the second input component $A_2(X^4)$.

Continuing the example case, after processing the third input component $A_1(x^4)$, the input register logic 208 shifts the values in the input register 202a so that the coefficients of the fourth input component $A_0(x^4)$ are available at the tapped register locations. The interconnect logic 206 accesses the fourth input component $A_0(x^4)$ by reading the binary values at register locations . . . A[8], A[4], A[0] (which are the tapped register locations 203d, 203h, etc. as a result of the shifting) in the input register 202a. Next, the interconnect logic 206 accumulates the output component $A_0(x^8)$mod f(x) to the output register 202b. In some implementations, the output component $A_0(x^8)$ does not need to be shifted in the output register 202b because $A_0(x^8)$ appears in the decomposition of $A(x)^2$ without a multiplying x power. The output register logic 210 may reduce the resulting field element in the output register 202b by f(x). In some cases, no reduction is needed.

As a result of the operations performed by the processor logic 204, the binary values stored in the output register 202b represent $A(x)^2$, the square of the binary finite field element $A(x)$. In some cases, the square of the binary finite field element can be generated at the output register 202b when the interconnect logic 206 stores the final output component $A_0(x^8)$ in the output register 202b, when the output register logic 210 shifts the binary values in the output register 202b, when the output register logic 210 reduces the binary values in the output register 202b by an irreducible reduction polynomial, or by a combination of these and other operations.

As demonstrated by the example above, the square of a binary finite field element $A(x)$ can be computed by sequentially processing individual input components of the binary finite field element $A(x)$. In this example, only a subset of the register locations in the input register 202a are tapped. Although the input components $A_0(x^4)$, $A_1(x^4)$, $A_2(x^4)$, and $A_3(x^4)$ are described as being processed in series and in a certain order in the example above, the input components can be processed in a different order (e.g., the opposite order), in a different manner, or both in some cases.

Figure 3:
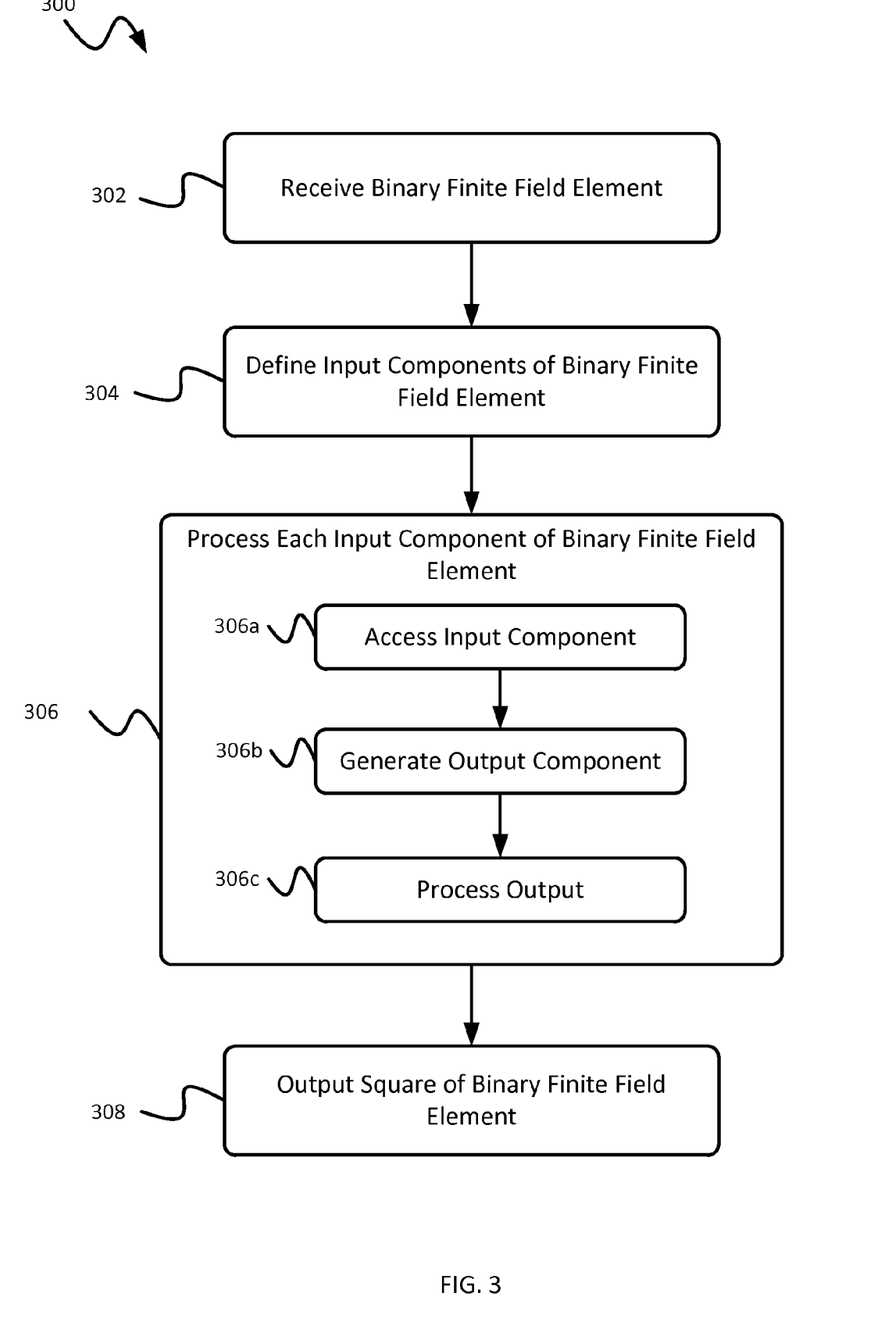
FIG. 3 is a flow chart showing an example technique for squaring binary finite field elements.

FIG. 3 is a flow chart showing an example process 300 for squaring binary finite field elements. In some implementations, some or all aspects of the example process 300 can be implemented by a specialized processor, a general-purpose processor, or combinations of these and other types of data processing apparatus. For example, aspects of the process 300 can, in some implementations, be performed by the computing system 100a of FIG. 1A, the computing system 100b of FIG. 1B, the processor 200 of FIG. 2, or another type of device or system. The example process 300 can include additional or different operations, and the operations may be executed in the order shown or in a different order. In some cases, one or more operations in the process 300 can be repeated or executed in an iterative fashion.

At 302, a binary finite field element is received. The binary finite field element is represented by a sequence of binary values. The sequence of binary values can be received at an input register. For example, the input register can receive the binary finite field element from a memory by a data bus that couples the input register to the memory. The sequence of binary values can be stored in a sequence of locations in the register.

At 304, input components of the binary finite field elements are defined. The binary finite field element can be expressed as a combination (e.g., a sum) of the input components. The input components can be defined according to intervals in the sequence of binary values. In some examples, taps at a subset of the input register locations define the intervals. As an example, interconnect logic coupled to the input register may include taps at every $g^{th}$ location in the input register. The intervals may be defined by other types of hardware, by data stored in a memory, or by a combination of these and other features.

Each of the input components can include a binary value from each interval in the sequence. In some cases, the intervals define a period, for example, where substantially all of the intervals are the same length. The intervals can define a period where one or more of the intervals (e.g., the first or last interval in the sequence) is shorter than the others. In some examples, the period is equal to the interval length, and each input component includes the values at a different phase within each period. As such, the binary finite field element may correspond to a sum of phase-shifted input components.

As a particular example, a binary finite field element is represented by a sequence of n binary values. The sequence includes k intervals, and each interval includes g binary values. Accordingly, in this example n=g*k, and g input components can be defined according to the k intervals in the sequence. Each input component may include k binary values. In particular, the $i^{th}$ input component includes the $i^{th}$ binary value within each of the k intervals. For example, the first input component includes the first binary value within each interval, the second input component includes the second binary value within each interval, the $g^{th}$ input component includes the $g^{th}$ binary value within each interval, etc. The input components can be defined in a different manner.

At 306, each of the input components is processed. The input components can be processed in an iterative manner by processor logic. For example, each input component can be processed by accessing the individual input component from the input register (306a), generating an individual output component based on the individual input component (306b), and processing the output values in the output register (306c). In one or more of the iterations, accessing an input component (306a) may include shifting the binary values in the input register, reading binary values at a subset of the register locations, and possibly other operations. As such, each of the input components can be accessed by shifting the appropriate values to tapped register locations. Accordingly, the input components can be accessed by taps at a subset of the register locations.

In one or more of the iterations, generating the output component (306b) may include accumulating the output component in the output register, and possibly other operations. In some cases, the output components are generated by applying same operation to a different input component upon each iteration, and consequently the same operation can be applied to each individual input component. For example, an output component can be generated by applying an unreduced linear squaring operation to an input component upon each iteration. An unreduced linear squaring operation may map an input component represented as $A_i(x^g)$ to an appropriate output component, for example, represented as $A_i(x^{2g})$.

In one or more of the iterations, processing the output values in the output register (306c) may include shifting the binary values in the output register, reducing the binary finite field element defined by the binary values in the output register, or both these, and possibly other operations. Generally, the process 300 can be implemented using finite field representations that do not always fully reduce elements modulo the defining irreducible polynomial. Accordingly, the process 300 can be implemented using partially reduced quantities. As such, the binary finite field element represented by the binary values stored in the output register (e.g., the square of the input binary finite field element) can be fully reduced, partially reduced, unreduced, or otherwise, as appropriate.

In some implementations, after the input components have been processed at 306, the binary values in the output register represent the square of the binary finite field element received at 302. Accordingly, the square may be generated by one or more of the operations performed at 306. In some cases, the square is generated by operations performed that produce an output in the output register (e.g., storing an output component in the output register, shifting values in the output register, reducing the binary finite field element defined by values in the output register, one or more post-processing operations, etc.).

At 308, the square of the binary finite field element is outputted. The square of the binary finite field element includes a sequence of binary values. The binary finite field element can be outputted by the output register. For example, the square may be outputted by transferring the binary values in the output register to a memory, another register, or a different type of structure. For example, a memory can receive the square of the binary finite field element from the output register over a data bus that couples the output register to the memory.

FIGS. 4A-4K are tables showing operations of an example squaring algorithm for binary finite fields. In some cases, one or more operations of the squaring algorithm represented in FIGS. 4A-4K can be used to execute one or more operations of the example process 300 shown in FIG. 3. In the example shown in FIGS. 4A-4K, a processor is used to compute a square modulo the irreducible polynomial $$f(x)=x^{13}+x^4+x^3+x+1. \qquad (8)$$

This example is provided primarily for illustration purposes. Many applications that implement binary finite field arithmetic utilize larger irreducible polynomials. For example, ECC-related applications may utilize irreducible polynomials ranging from hundreds of bits to thousands of bits, or larger. In the present example, the input binary finite field element is represented by twelve binary coefficients of A(x) (i.e., the coefficients $a_0, a_1, a_2, \ldots a_{11}$), which are initially stored at input register locations A[i]. The squaring algorithm produces $A(x)^2$ in an output register B. As such, the square of the binary finite field element is represented by the binary coefficients of $A(x)^2$ stored at output register locations B[i].

The squaring algorithm represented in FIGS. 4A-4K can compute $A(x)^2$ using hardware that is also used for serialized multiplication. In particular, the squaring algorithm shown in FIGS. 4A-4K can compute $A(x)^2$ using accumulation XOR gates that can also be used for serialized multiplication of binary finite field elements. As such, in this example, $A(x)^2$ can be computed over multiple clock cycles and the only additional hardware needed to implement the squaring algorithm are three XOR gates. The squaring algorithm represented in FIGS. 4A-4K can be implemented using taps at only four input register locations. Some conventional squaring algorithms can compute $A(x)^2$ in one clock cycle and require twenty-three XOR gates, using taps at all input register locations.

In FIGS. 4A, 4D, 4G, and 4J, accumulation XOR gates are represented by the symbol "⊕=", which denotes XORing the right-hand side value into the left-hand side location. The use of accumulation XOR gates in FIGS. 4A, 4D, 4G, and 4J represents the reuse of accumulation XOR gates that can also be used for multiplication of binary finite field elements. Additional XOR gates (not reused for serialized multiplication) are represented in FIGS. 4A, 4D, 4G, and 4J by the symbol "⊕". The specific operations shown and described in FIGS. 4A-4K are provided as examples. Additional or different operations may be used. The example algorithm shown in FIGS. 4A-4K considers the case of four input components. The algorithm may be modified to use a different number of input components.

Initially, all of the output register locations store zeros, such that B[i]=0 for all i=1, ... 12. In the first stage of the squaring algorithm, the first input component $A_3(x^4)$ is accessed by reading input values A[15], A[11], A[7], A[3] at tapped location. The tap at the A[15] location is used because, when the values A[12], A[8], A[4], A[0] are later shifted, a tap at location A[12] is needed. Table 400a in FIG. 4A shows example operations for accumulating the output element $A_3(x^8)$ mod f(x) into the output register B. In the first stage, A[15]=0 (assuming a redundant representation of A(x), which does not reduce values to the fullest extent possible, is not used). Table 400b in FIG. 4B shows the result of the accumulation operations represented in FIG. 4A. Table 400c in FIG. 4C shows the result from FIG. 4B after scaling the output values in table 400b by $x^2$. The output values are scaled by $x^2$ by shifting the values in the output register B.

In the second stage of the squaring algorithm, the same hardware can be used to accumulate the second output component $A_2(x^8)$ in the output register B. The values in the input register are shifted, and the tapped locations now contain the values A[14], A[10], A[6], A[2]. Assuming a redundant representation of A(x) is not used, A[14]=0. Table 400d in FIG. 4D shows operations for accumulating the second output component $A_2(x^8)$ in the output register B. Table 400e in FIG. 4E shows the result of the accumulation operations represented in FIG. 4D. Table 400f in FIG. 4F shows the result from FIG. 4E after scaling the output values in table 400e by $x^2$.

Figure 4G:
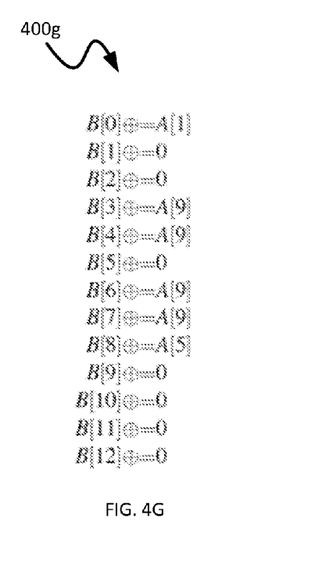
Figure 4H:
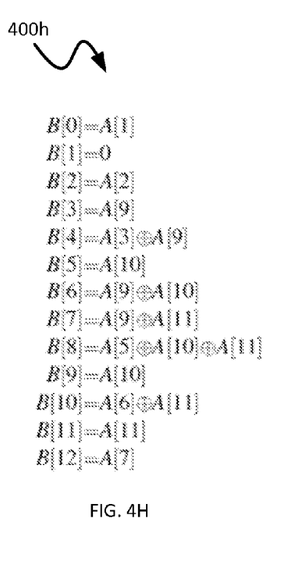
Figure 4I:
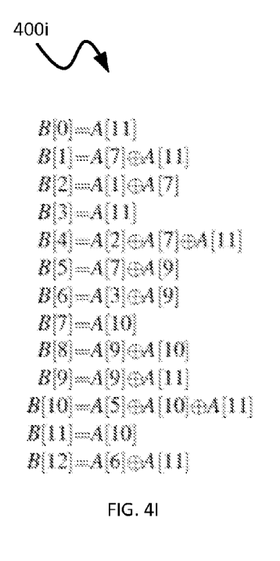

In the third stage of the squaring algorithm, the same hardware can be used to accumulate the third output component $A_1(x^8)$ in the output register B. The values in the input register are shifted, and the tapped locations now contain the values A[13], A[9], A[5], A[1]. Assuming a redundant representation of A(x) is not used, A[13]=0. Table 400g in FIG. 4G shows operations for accumulating the third output component $A_1(x^8)$ in the output register B. Table 400h in FIG. 4H shows the result of the accumulation operations represented in FIG. 4G. Table 400i in FIG. 4I shows the result from FIG. 4H after scaling and the output values in table 400g by $x^2$ and reducing the scaled output values by f(x).

Figure 4J:
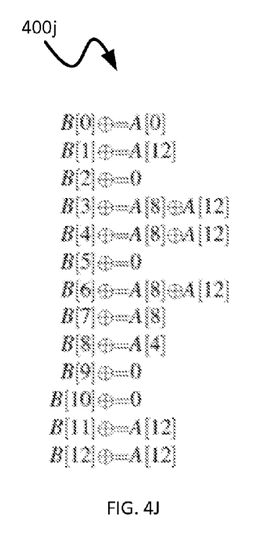
Figure 4K:
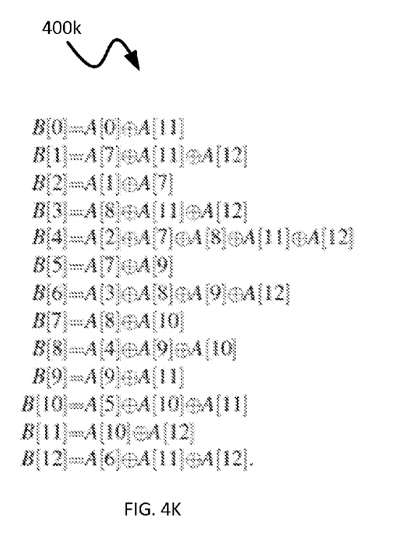

In the fourth stage of the squaring algorithm, the same hardware can be used to accumulate the fourth output component $A_0(x^8)$ in the output register B. The values in the input register are shifted by one position, and the tapped locations now contain the values A[12], A[8], A[4], A[0]. Table 400j in FIG. 4J shows operations for accumulating the fourth output component $A_0(x^8)$ in the output register B. Table 400k in FIG. 4K shows the result of the accumulation operations represented in FIG. 4J. In the example shown, accumulating the fourth output component at the output register B generates the square $A(x)^2$ at the output register B. Additional or different operations may be applied.

FIG. 5 is a table 500 showing operations of another example squaring algorithm for binary finite fields. In particular, FIG. 5 shows the accumulation XOR gates that can be used to generate the square of a binary finite field element in $\mathbb{F}_{2^{163}}$. The algorithm can include additional operations, such as, for example, the operations similar to those described with respect to FIGS. 4A-4K. In some cases, the operations represented in FIG. 5 can be used to implement one or more operations of the example process 300 shown in FIG. 3.

The specific operations shown and described in FIG. 5 are provided as examples. Additional or different operations may be used. The example algorithm shown in FIG. 5 considers the case of four input components. The algorithm may be modified to use a different number of input components. In the example shown in FIG. 5, a processor is used to compute a square modulo the irreducible polynomial $$f(x)=x^{163}+x^7+x^6+x^3+1. \quad (9)$$

This size may be useful, for example, in low-strength cryptography for ECC or in other contexts. Different polynomials, including polynomials of other sizes, may be used as appropriate. The input binary finite field element is represented by the 163 binary coefficients of A(x) (i.e., the coefficients $a_0, a_1, a_2, \ldots a_{162}$) initially stored at input register locations A[i], and the squaring algorithm produces $A(x)^2$ in an output register B. The square of the input binary finite field element is represented by the binary coefficients of $A(x)^2$ stored at output register locations B[i].

The squaring algorithm represented in FIG. 5 can compute $A(x)^2$ using hardware that is also used for serialized multiplication. In particular, the squaring algorithm represented in FIG. 5 can compute $A(x)^2$ using accumulation XOR gates that can also be used for serialized multiplication of binary finite field elements. As such, in this example, $A(x)^2$ can be computed over multiple (e.g., four) clock cycles, the only additional hardware needed to implement the squaring algorithm are twenty-two XOR gates. The squaring algorithm represented in FIG. 5 can be implemented using only taps at forty-one input register locations. Some conventional squaring algorithms can compute $A(x)^2$ in one clock cycle and require 252 XOR gates, using taps at all input register locations.

Initially, all of the output register locations store zeros, such that B[i]=0 for all i=1, . . . 162. In the first stage of the squaring algorithm, the first input component $A_3(x^4)$ is retrieved by accessing input values at tapped locations A[163],A[159],A[155] . . . A[11],A[7],A[3]. The tap at A[163] is used because non-zero values may potentially be shifted to that location later in the algorithm. Table 500 in FIG. 5 shows example operations for accumulating the output element $A_3(x^8)$ mod f(x) in the output register B. The squaring algorithm can proceed based on adapting the techniques described above with respect to FIGS. 4A-4K, or in another manner.

In the examples described above, $A(x)^2$ is computed with components having the most significant contribution first. This order may be convenient, for example, where serialized multiplication is also executed with components having the most significant contribution first. However, the components could be processed in a different order (e.g., in the opposite order). Similarly, additional or different locations in the input register can be tapped, and the input register logic can be adapted accordingly. Also, the examples described above use a gap of size four to decompose the input into four terms. Other gap sizes can be used, allowing for a tradeoff between the hardware size and computation time. For example, in some cases the gap size can be any integer between two (corresponding to two input components) and an upper threshold (e.g., thirty, forty, etc.). The upper threshold can be determined from practical considerations, such as the number of clock cycles used for serialized multiplication. Typically, larger gaps give rise to less hardware but longer serialized computation.

In a redundant representation of A(x), which might use more than the minimal number of bits to represent A(x) (e.g., 192 bits instead of 163), a similar technique may be deployed, where reduction is performed with a shifted version of the irreducible polynomial. As a particular example, $x^{29}f(x)$ could be used to reduce the values to fit in a register of 192 bits. Sequential computation of squares by considering inputs at some regular gap is possible in this situation as well.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit), which components may include programmable control or hardwired control.

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect, the square of an input binary finite field element is calculated. In some cases, the input binary finite field element is treated as a sum of input components, and the input components are processed serially.

In some aspects, multiple input components of a binary finite field element are each processed by the same processor logic hardware. In some instances, the hardware includes interconnect logic, shifting logic, reduction logic, or any suitable combination of these and other types of components.

In some aspects, a binary finite field element is received at a first register. The binary finite field element includes a sequence of binary values. Input components of the binary finite field element are accessed. The input components are defined according to intervals in the sequence, and each input component includes one of the binary values from each interval in the sequence. Output components are generated based on the input components. A square of the binary finite field element is generated in a second register based on the output components.

Implementations of these and other aspects may include one or more of the following features. The intervals in the sequence define a period. The binary values for each input component are defined according to the period and a phase for the input component. The binary finite field element corresponds to a sum of phase-shifted input components. Defining a greater number of input components increases a time requirement for generating the output components and reduces a hardware requirement for generating the output components. Generating the output components includes sequentially processing each of the input components individually. Sequentially processing each of the input components individually includes using a hardware module to apply an operation to each of the input components. The hardware module applies the same operation to each of input components. The hardware module includes exclusive-or gates. Applying the operation to an input component includes applying the exclusive-or gates to at least some of the binary values in the input component. At least one of the exclusive-or gates accumulates an output value into the second register.

Additionally or alternatively, implementations of these and other aspects may include one or more of the following features. One or both of the binary finite field element received at the first register and the square of the binary finite field element have not been reduced by an irreducible reduction polynomial. One or both of the binary finite field element received at the first register and the square of the binary finite field element are reduced by an irreducible reduction polynomial. Generating the output components based on the input components includes accumulating the output components into the second register. Generating the square of the binary finite field element based on the output components includes shifting binary values in the second register. Generating the square further includes reducing a binary finite field element defined by the shifted binary values in the second register. The square of the binary finite field element is outputted from the second register.

In some aspects, data processing apparatus are operable to access input components of a binary finite field element. The binary finite field element includes a sequence of binary values, and the input components are defined according to intervals in the sequence. Each of the input components includes one of the binary values from each of the intervals in the sequence. The data processing apparatus are operable to generating an output component for each of the input components. The data processing apparatus are operable to generate a square of the binary finite field element based on the output components.

Implementations of these and other aspects may include one or more of the following features. The data processing apparatus includes a first register that receives the binary finite field element, a second register, and processor logic operable to perform data processing operations. The first register includes multiple register locations. The processor logic includes taps at a subset of the register locations. Each of the input components includes a subset of the binary values in the sequence. The processor logic are operable to access the first component by retrieving the binary values stored at the tapped register locations. The processor logic are operable to access each subsequent input component by shifting the binary values in the first register and accessing the subsequent input component by retrieving the binary values stored at the tapped register locations after the shifting.

Additionally or alternatively, implementations of these and other aspects may include one or more of the following features. The processor logic operable to generate a plurality of output components includes accumulation exclusive-or gates. Each accumulation exclusive-or gate is operable to receive a first input value from a first location in the first register, receive a second input value from a second location in the second register, generate an exclusive-or output value based on the first input value and the second input value, and store the exclusive-or output value in the second register at the second register location. The accumulation exclusive-or gates can be used to perform squaring of binary finite field elements and sequential multiplication of binary finite field elements.

Additionally or alternatively, implementations of these and other aspects may include one or more of the following features. The processor logic operable to generate a plurality of output components includes interconnect logic operable to execute multiple iterations. Each iteration includes accessing an individual input component from the first register. Each iteration includes generating an individual output component based on the individual input component and binary values stored in the second register. Each iteration includes storing the individual output component in the second register.

Additionally or alternatively, implementations of these and other aspects may include one or more of the following features. The processor logic operable to generate the square includes processor logic operable to shift the binary values of one or more of the output components in the second register. The processor logic operable to generate the square includes processor logic operable to reduce one or more of the output components in the second register.

Additionally or alternatively, implementations of these and other aspects may include one or more of the following features. A computing system includes the data processing apparatus communicably coupled to a memory by a data bus. The data processing apparatus are operable to receive the binary finite field element from the memory through the data bus. The data processing apparatus are operable to output the square of the binary finite field element to the memory through the data bus.

Additionally or alternatively, implementations of these and other aspects may include one or more of the following features. The data processing apparatus is a cryptographic processing unit, and the binary finite field element represents a component of an elliptic curve point. The data processing apparatus includes binary logic circuitry operable to perform the operations. The memory is a random access memory and the data processing apparatus is a specialized processor. The memory is the memory of a general purpose processor and the data processing apparatus is a specialized processor.

In some aspects, binary finite field squaring is computed by considering the inputs as a sum of shifted polynomials. The polynomials have non-zero values at some period or gap greater than one. The square is performed by sequentially employing the deployed hardware repeatedly.

Implementations of these and other aspects may include one or more of the following features. The XOR gates and hardware used for sequential multiplication are reused to aid in the sequential computation of the square. These hardware components use for the sequential multiplication that are reused for the squaring operation include the XOR gates that accumulate intermediate results and the circuits used to reduce the accumulation of the intermediate results. The period or gap size between hardware inputs is equal to the number of components into which the input value is decomposed. The period or gap size is selected so as to balance the hardware cost of squaring against the time required for squaring. A larger period or gap between inputs reduces the hardware cost and increases the number of iterations.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of squaring a binary finite field element by a data processing apparatus, the method comprising:
    receiving a binary finite field element at a first register, the binary finite field element comprising a sequence of binary values, wherein the first register includes a first plurality of register locations configured to store the sequence of binary values;
    accessing input components of the binary finite field element, the input components defined according to intervals in the sequence, wherein each of the input components includes one of the binary values from each of the intervals in the sequence;
    generating output components based on the input components using interconnect logic circuitry, wherein the interconnect logic circuitry includes a plurality of accumulation gates; and
    generating a square of the binary finite field element in a second register based on the output components, wherein the second register includes a second plurality of register locations configured to store the square of the binary finite field element.

2. The method of claim 1, wherein the intervals in the sequence define a period, and the binary values for each input component are defined according to the period and a phase for the input component, such that the binary finite field element corresponds to a sum of phase-shifted input components.

3. The method of claim 1, wherein the input components are accessed and the output components are generated by an iterative process, and each iteration of the iterative process comprises:
    accessing an individual input component;
    generating an individual output component based on the individual input component and binary values stored in the second register; and
    storing the individual output component in the second register.

4. The method of claim 1, wherein generating the output components based on the input components comprises processing the input components in series.

5. The method of claim 4, wherein processing an input component comprises accumulating an output component into the second register based on the input component.

6. The method of claim 5, wherein accumulating an output component into the second register based on an input component comprises applying a plurality of accumulation exclusive-or gates based on binary values in the first register and binary values in the second register.

7. The method of claim 1, wherein receiving a binary finite field element at a first register comprises receiving a binary finite field element that has not been fully reduced by an irreducible reduction polynomial.

8. The method of claim 1, wherein generating a square of the binary finite field element comprises generating a binary finite field element that has not been fully reduced by an irreducible reduction polynomial.

9. The method of claim 1, wherein generating a plurality of output components based on the input components comprises accumulating the output components into the second register, and generating the square of the binary finite field element based on the output components comprises shifting binary values in the second register.

10. The method of claim 1, wherein generating a plurality of output components based on the input components comprises accumulating the output components into the second register, and generating the square comprises reducing a binary finite field element defined by binary values in the second register.

11. The method of claim 1, further comprising outputting the square of the binary finite field element from the second register.

12. The method of claim 1, wherein defining a greater number of input components increases a time required to generate the output components and reduces a hardware required to generate the output components.

13. The method of claim 1, wherein the sequence includes intervals of length g that define g input components $A_i(x^g)$, and generating output components based on the input components comprises generating an output component $A_i(x^{2g})$ for each input component $A_i(x^g)$.

14. A data processing apparatus operable to perform operations for squaring a binary finite field element, the data processing apparatus comprising:
    a first register comprising a first plurality of register locations operable to store a sequence of binary values that define a binary finite field element;
    a second register comprising a second plurality of register locations; and
    interconnect logic circuitry including a plurality of accumulation gates operable to:
        access input components from the first register according to intervals in the sequence, wherein each of the input components includes one of the binary values from each of the intervals in the sequence;
        generate a plurality of output components based on the input components; and
        generate a square of the binary finite field element in the second register based on the output components.

15. The data processing apparatus of claim 14, wherein the intervals in the sequence define a period, and the binary values for each input component are defined according to the period and a phase for the input component, such that the binary finite field element corresponds to a sum of phase-shifted input components.

16. The data processing apparatus of claim 15, wherein the input components include a first input component and at least one subsequent input component, each of the input components includes a subset of the binary values, and the interconnect logic circuitry operable to access the input components includes interconnect logic circuitry operable to:
  access the first component by retrieving the binary values stored at tapped register locations in the first register; and
  access each of the subsequent input components by:
    shifting the binary values in the first register; and
    accessing the subsequent input component by retrieving the binary values stored at the tapped register locations after the shifting.

17. The data processing apparatus of claim 14, wherein the interconnect logic circuitry includes taps at a subset of the register locations.

18. The data processing apparatus of claim 14, wherein the plurality of accumulation gates comprise a plurality of accumulation exclusive-or gates, wherein each accumulation exclusive-or gate is operable to:
  receive a first input value from a first location in the first register;
  receive a second input value from a second location in the second register;
  generate an exclusive-or output value based on the first input value and the second input value; and
  store the exclusive-or output value in the second location in the second register location.

19. The data processing apparatus of claim 18, further comprising serialized multiplication interconnect logic circuitry operable to perform sequential multiplication of binary finite field elements, wherein serialized multiplication interconnect logic circuitry includes the plurality of accumulation exclusive-or gates.

20. The data processing apparatus of claim 14, wherein the interconnect logic circuitry operable to access the input components and generate the output components include interconnect logic circuitry operable to execute a plurality of iterations, wherein each iteration includes:
  accessing an individual input component from the first register;
  generating an individual output component based on the individual input component and binary values stored in the second register; and
  storing the individual output component in the second register.

21. The data processing apparatus of claim 14, wherein the interconnect logic circuitry operable to generate the square includes interconnect logic circuitry operable to shift binary values in the second register.

22. The data processing apparatus of claim 14, wherein the interconnect logic circuitry operable to generate the square includes interconnect logic circuitry operable to reduce one or more of the output components in the second register.

23. The data processing apparatus of claim 14, wherein the interconnect logic circuitry operable to generate the plurality of output components includes interconnect logic circuitry operable to perform an unreduced linear squaring operation, and the interconnect logic circuitry operable to generate the square includes interconnect logic circuitry operable to perform a reduction operation with respect to an irreducible polynomial defining a finite field.

24. A computing system comprising:
  a memory operable to store computer-readable data;
  a data processing apparatus communicably coupled to the memory by a data bus, wherein the data processing apparatus includes a first register, a second register, and interconnect logic circuitry, the first register includes a first plurality of register locations, the second register includes second plurality of register locations, and the interconnect logic circuitry includes a plurality of accumulation gates, the data processing apparatus operable to perform operations comprising:
    receiving a binary finite field element from the memory through the data bus, the binary finite field element comprising a sequence of binary values;
    accessing input components of the binary finite field element, the input components defined according to intervals in the sequence, wherein each of the input components includes one of the binary values from each of the intervals in the sequence;
    generating an output component for each of the input components using interconnect logic circuitry, wherein the interconnect logic circuitry includes a plurality of accumulation gates;
    generating a square of the binary finite field element based on the output components; and
    outputting the square of the binary finite field element to the memory through the data bus.

25. The computing system of claim 24, wherein the intervals in the sequence define a period, and the binary values for each input component are defined according to the period and a phase for the input component, such that the binary finite field element corresponds to a sum of phase-shifted input components.

26. The computing system of claim 24, wherein the data processing apparatus comprises a cryptographic processing unit, and the binary finite field element represents a coordinate of an elliptic curve point.

27. The computing system of claim 24, wherein the data processing apparatus comprises binary logic circuitry operable to perform the operations.

28. The computing system of claim 24, wherein the memory comprises a random access memory and the data processing apparatus comprises a specialized processor.

29. The computing system of claim 24, wherein the memory comprises a memory of a general purpose processor and the data processing apparatus comprises a specialized co-processor.

* * * * *